United States Patent
Naumann (10) Patent No.: US 6,804,265 B1
(45) Date of Patent: Oct. 12, 2004

(54) APPARATUS AND METHOD INTERFACE IMPROVEMENT FOR DIGITAL CIRCUITS

(75) Inventor: Joel C. Naumann, Morgan Hill, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/574,333

(22) Filed: May 19, 2000

(51) Int. Cl.[7] .................................................. H04J 3/06
(52) U.S. Cl. .................... 370/504; 370/527; 370/529; 370/537; 710/2; 375/363
(58) Field of Search .................. 370/419, 463, 370/498, 503, 504, 522, 527, 529, 536, 542, 543, 544, 205, 537; 710/1, 2, 20, 21, 58, 62, 65, 70, 71; 375/353, 354, 359, 360, 361, 363, 368, 282

(56) References Cited

U.S. PATENT DOCUMENTS

| | | | | |
|---|---|---|---|---|
| 4,847,863 A | * | 7/1989 | Watson | 375/222 |
| 5,030,951 A | * | 7/1991 | Eda et al. | 341/100 |
| 5,272,703 A | * | 12/1993 | Peters | 370/505 |
| 5,574,951 A | * | 11/1996 | Sawyer et al. | 710/45 |
| 5,946,327 A | * | 8/1999 | Murphy | 370/517 |
| 6,097,735 A | * | 8/2000 | Nemoto | 370/476 |
| 6,160,806 A | * | 12/2000 | Cantwell et al. | 370/360 |
| 6,370,155 B1 | * | 4/2002 | Cantwell et al. | 370/465 |

* cited by examiner

Primary Examiner—Hassan Kizou
Assistant Examiner—D Levitan
(74) Attorney, Agent, or Firm—Blakely, Sokoloff, Taylor & Zafman LLP (57) ABSTRACT

An apparatus comprising a parallel arrangement of circuits is described. Each circuit has a data net input. Each circuit has an indication signal net input configured to transport an indication signal having shapes and/or temporal locations different than a data signal on the data net input.

40 Claims, 9 Drawing Sheets

MIDDLE OF CYCLE TRANSITION INDICATES GAP IN TIMING

FIG. 8

APPARATUS AND METHOD INTERFACE IMPROVEMENT FOR DIGITAL CIRCUITS

FIELD OF THE INVENTION

The field of invention relates to signal processing. More specifically the field of invention relates to an improved interface circuit that employs an indication signal.

BACKGROUND

Due to advances in silicon technology, the operational speed of various channels continues to increase. For example, in the communications field, traditional Wide Area Network (WAN) channels having data rates under 10 Mb/s (such as T1,/E1 fractional T1 (FT1), x.21, v.35, RS-232, RS-449, RS-532 are being replaced or enhanced by WAN technologies having data rates greater than 10 Mb/s (such as High Speed Serial Interface (HSSI), ADSL, VDSL, DS3 and cable modem).

Even though faster channels are being implemented, however, it is often more economical to preserve (where possible) designs originally used to support legacy channels. That is, in order to implement a new, faster channel technology, it is often more economical to squeeze more bandwidth out of an existing, original design by modest modification rather than introduce a completely new design. Note that, in light of this, although silicon advances support higher data rates; mechanical solutions such as connectors tend to advance slower.

Thus economic advantage is realized in the form of downward compatibility. One aspect of downward compatibility is that higher speed channels may be integrated into products that also support lower speed channels. Products designed with downward compatibility in mind allow: 1) customers to make the transition from lower speed channels to higher speed channels gradually resulting in longer lifetimes for the slower but cheaper traditional channel technologies; and 2) manufacturers to minimize development and manufacturing costs since completely new designs tend take more time to design as well as use new, more expensive materials.

Figure 1A:
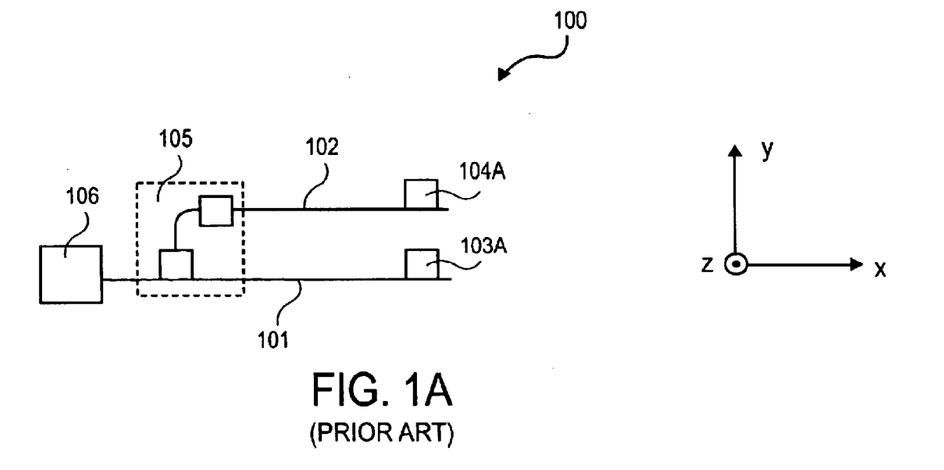
FIG. 1a shows a prior art network interface card from a first perspective.

A good, practical example of the notions discussed above concern adapter cards used for networking routers, switches or other networking systems. FIG. 1a shows an example of an adapter card 100 designed for corporate campus environments. A plurality of such cards are typically inserted into the backplane of a campus switch or router. The adapter card 100 example comprises two cards: a base card 101 used for Local Area Network (LAN) connections and a daughter card 102 used for WAN connections. The daughter card 102 plugs into the connector 105 that is affixed to the base card 101. Backplane connector 106 typically passes signals from/to the base and daughter cards 101, 102 to/from a central switching or routing card in the networking system.

Figure 1B:
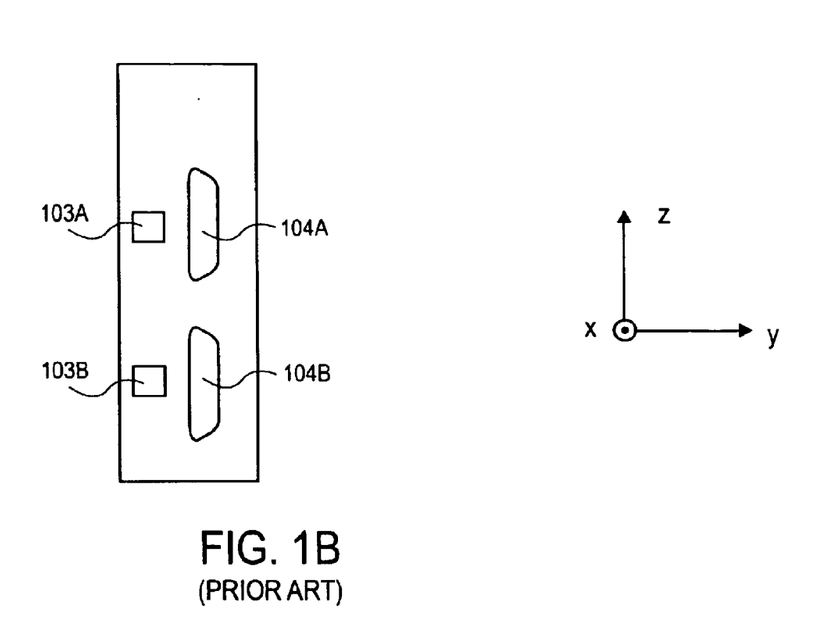
FIG. 1b shows a prior art network interface card from a second perspective.

FIG. 1b indicates how the card appears to a customer after the card is plugged into a networking system. Note that a single card offers both LAN connections (e.g., ethernet connections via RJ48 connectors 103a,b) and WAN connections (e.g., an X.21 connection via D shell connector 104a, b). Referring back to FIG. 1a, in order to support downward compatibility with respect to the WAN daughter card 102, adapter card 100 should support both older, slower WAN daughter cards as well as newer, faster WAN daughter cards.

This means the electrical signaling that runs through connector 105 must be capable of supporting data rates greater than 10 Mb/s (e.g., a 45 Mb/s DS3 data rate). In order to provide a downward compatible solution, the design of the electrical interface between the base card 101 and daughter card 102 through connector 105 (originally designed to operate at speeds under 10 MB/s (e.g., a 1.5 Mb/s T1 data rate)) must be modified to support slower legacy WAN daughter cards as well as faster, more recent WAN technologies.

Figure 2:
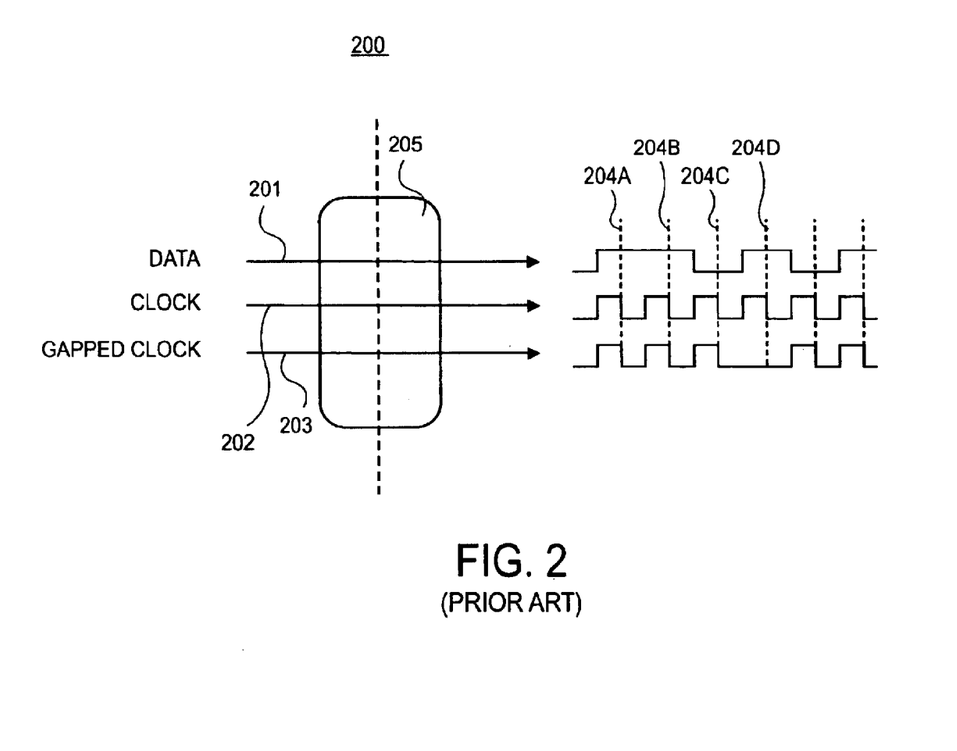
FIG. 2 shows a gapped clock approach.

FIG. 2 shows an example of an original, legacy interface 200 between the base card 101 and the daughter card 102 used for slower speed WAN channels. In FIG. 2, a single data signal 201 was driven over the connector 205 along with a clock 202 and a gapped clock 203. Other implementations could send the data signal with only a gapped clock 203. Clock 202 is the masterclock for the interface 200 of FIG. 2. Thus, typically, a data value (e.g., at consecutive data values locations 204a,b,c,d) appears on the data signal 201 net per clock 202 tick.

Clock 202 is also typically the masterclock of the card sending the data signal 201. Note that at least two interfaces 200 are implemented across connector 105 of FIG. 1a. That is, referring back to FIG. 1a, the base card 101 sends data to the daughter card 102 across an interface such as interface 200 of FIG. 2. Similarly, the daughter card 102 sends data to the base card 101 across another interface which may be a duplicate of interface 200 of FIG. 2. The gapped clock 203 may be used to identify or select enabled channels within a data stream. For example, gapped clock 203 may be used to identify which 8 kb/s channels within an FT1 line are selected.

The gapped clock 203 may also be used to account for differences between the clocking frequency of the interface masterclock 202 and any other clock used to clock the data stream before being sent over interface 200. For example, referring to FIGS. 1a and 2, consider the case where WAN data is being: 1) received by the daughter card 102 from a network connection, then; 2) delivered from the daughter card 102 across connector 105 to the base card 101 and then; 3) ultimately delivered to a central routing or switching card via backplane connector 106.

In this case, there may be a difference between the clock used by the network to send the data to the daughter card 102 and the masterclock of the daughter card 102 and/or the clock 202 used to transmit the received data over the interface 200 between the daughter card 102 and base card 101. The gapped clock 203 of FIG. 2 accounts for differences between these clocks by occasionally negating a valid data value location in the data signal 201 where the clock differences could otherwise cause corrupted data.

Thus gapped clock 203 is used to indicate which data value locations 204a,b,c,d in the data signal 201 are valid. In the exemplary depiction in FIG. 2, data value locations 204a,b and c are valid while data value location 204d is invalid. This corresponds to the presence or lack thereof of a pulse in the gapped clock 203 signal.

SUMMARY OF INVENTION

An apparatus comprising a parallel arrangement of circuits is described. Each circuit has a data net input. Each circuit has an indication signal net input configured to transport an indication signal having shapes and/or temporal locations different than a data signal on the data net input.

Other features and advantages of the present invention will be apparent from the accompanying drawings and from the detailed description that follows below.

BRIEF DESCRIPTION OF THE DRAWINGS

The present invention is illustrated by way of example, and not limitation, in the Figures of the accompanying drawings in which.

DETAILED DESCRIPTION

An apparatus comprising a parallel arrangement of circuits is described. Each circuit has a data net input. Each circuit has an indication signal net input configured to transport an indication signal having shapes and/or temporal locations different than a data signal on the data net input.

Figure 3:
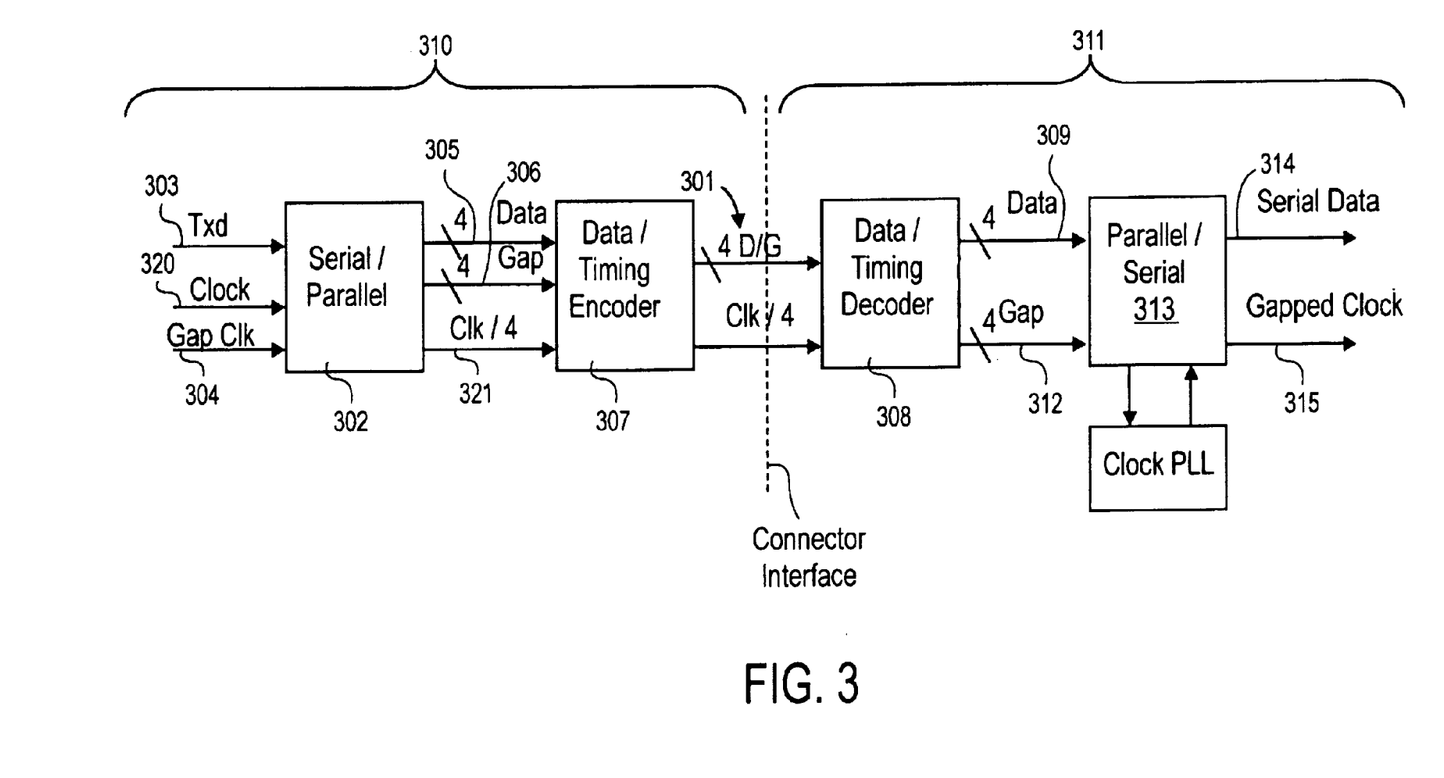
FIG. 3 shows an improved gapped clock approach.

FIG. 3 shows an improvement to the design of FIG. 2 that may be used to extend the bandwidth supported through the original legacy connector 105 of FIG. 1a. Note that: 1) the data signal has been paralleled (e.g., data signal 201 of FIG. 2 has been spread over four D/G signals 301) to increase the interface bandwidth; and 2) the gapped clock signal 304 has been integrated with the data signals 303 (within D/G signals 301) to conserve pin count consumption within connector 105.

Thus, more generally it may be said that when attempting to preserve a legacy interface when implementing a newer, faster technology (while retaining the same signalling rate as the original interface for legacy applications); an approach is to: 1) parallel the data flow to increase the bandwidth; and 2) integrate control signals with data signals in order to reduce the increase in signal lines caused by the paralleling of the data. Note that the gapped clock signal discussed above is a form of control signal. That is, control signals are non data signals that are used to properly transfer the data from one side of an interface to another side of an interface.

In the specific embodiment associated with FIG. 3, on the transmit side 310, in order to implement the paralleling design improvement, a serial/parallel converter 302 is used to parallel both serial data 303 and serial gapped clock 304 inputs. Thus serial/parallel converter 302 produces both a parallel transmit data signal 305 and a parallel transmit gapped clock signal 306.

In order to implement the improvement relating to the integration of the gapped clock and the data signals, on the transmit side 310, a data/timing encoder 307 is utilized. The data/timing encoder 307 integrates the parallel transmit data signal 305 and parallel transmit gapped clock signal 306 into D/G signals 301 according to a coding scheme such as the one discussed in more detail further ahead.

The integrated D/G signals 301 are then driven across connector 105 of FIG. 1a. Note that in this embodiment, eight signal lines are converted into four by the data/timing encoder's 307 integration of the parallel transmit data signal 305 and parallel transmit gapped clock signal 306.

On the receive side 311, after crossing connector 105 of FIG. 1a, a data/timing decoder 308 breaks the D/G signals 301 into separate data and gapped clock pairs that may be referred to respectively as parallel receive data signal 309 and parallel receive gapped clock signal 312. The parallel/serial block 313 then serializes the parallel receive data signal 309 into the serial data output 314 as well as serializes the parallel receive gapped clock signal 312 into a gapped clock output 315. Thus outputs 314, 315 correspond to inputs 303, 304.

Figure 4:
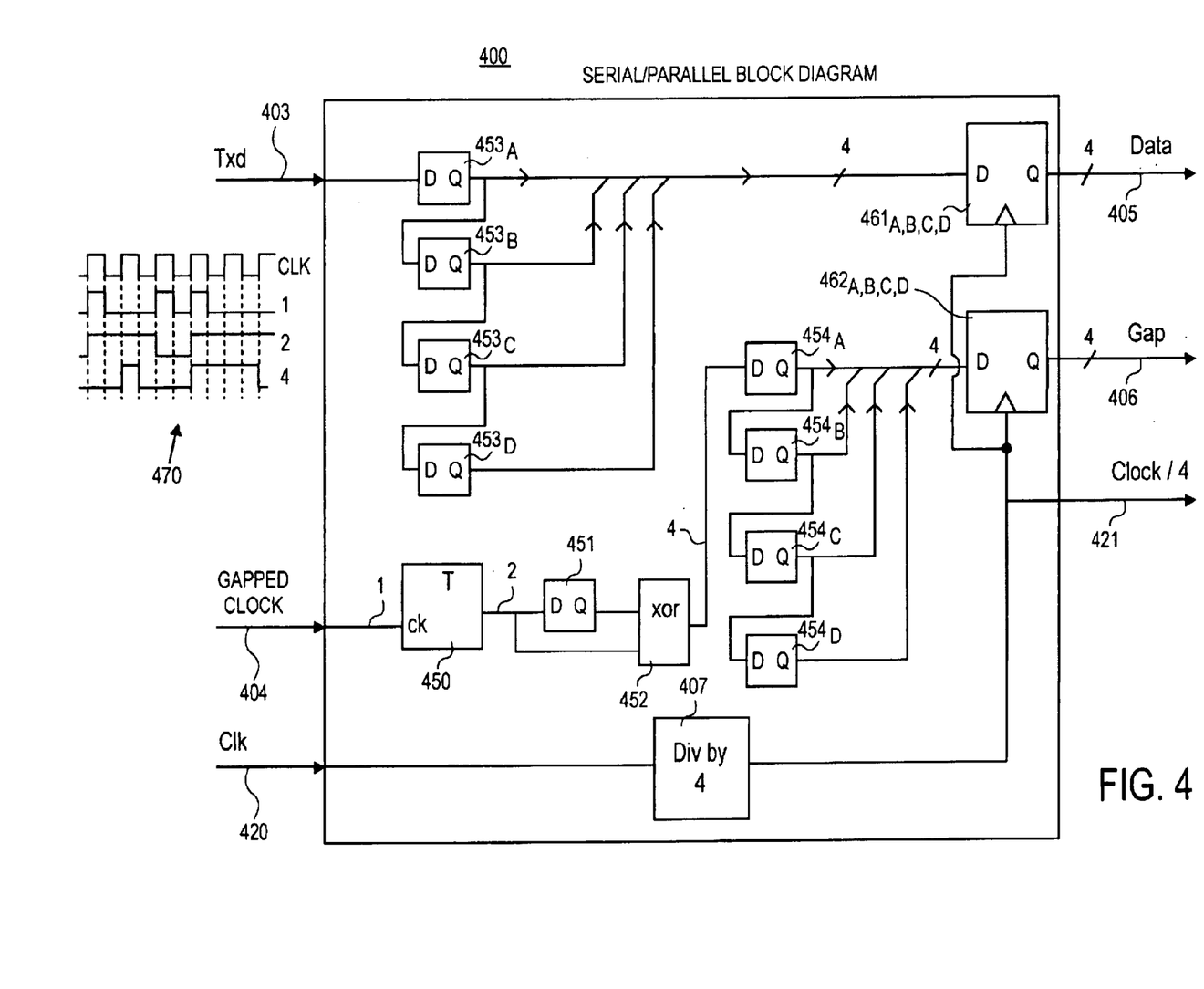
FIG. 4 shows an embodiment of the serial/parallel converter of FIG. 3.

FIG. 4 shows an embodiment 400 of the serial/parallel converter 302 of FIG. 3. Note that, consistent with the discussion above relating to newer, faster WAN technologies, the data rate associated with the serial data input 403 and serial gapped clock input 404 may be significantly higher than the data rates associated with the serial data and gapped clock of FIG. 2. For example, the serial data and gapped clock of FIG. 2 may correspond to 1.544 Mb/s DS1 rates while the data rate associated with the serial data input 403 and serial gapped clock input 404 may correspond to a 45 Mb/s DS3 rate.

The serial/parallel converter embodiment 400 of FIG. 4 converts serial data input 403 into four parallel streams (collectively referred to as transmit parallel data output 405) by issuing input data 403 to each parallel stream in a round robin fashion. The serial parallel converter 400 also converts serial gapped clock input 404 into four parallel streams (collectively referred to as parallel transmit gapped clock signal 406) by issuing gapped clock input 404 values to each parallel stream in a round robin fashion.

The T and DQ flip flops 450, 451 and XOR gate 452 (whose corresponding signals and their locations are indicated by reference labels 1, 2 and 4 in FIG. 4) generate a 100% duty cycle pulse to indicate valid data as shown in the associated timing diagram 470. DQ flip flop 453a–d, 454a–d clock inputs are wired to CLK 420 (although no such connection is shown in FIG. 4 for ease of drawing). DQ flip flops 461a, b, c, d, 462a, b, c, d are clocked by the CLK/4 signal 421. Note that only one flip flop is shown in FIG. 4 for what in actuality are four. Thus four flip flops exist at location 461a, b, c, d and location 462a, b, c, d.

Serial/parallel converter designs other than that of FIG. 4 may be implemented. In the embodiment of FIGS. 3 and 4, each serial stream is converted into four parallel streams. This is not a requirement, however. Those of ordinary skill will be able to design other implementations having a parallel/serial ratio of greater than or less than 4.0.

Factors that go into how many parallel nets per serial stream are appropriate for a particular implementation include available layout space as well as the maximum supported frequency per parallel net. For example, if connector 105 has long, heavily inductive wires (which limit the frequency per parallel net) but many available extra wires, another improved design may support more than four parallel nets per serial stream in order to further reduce the frequency utilized per parallel net. A net is the wiring or other medium used to carry a signal.

Take note of the divide by four block 407 of FIG. 4. Divide by four block 407 divides the clock signal input 320, 420 by four to produce a $\frac{1}{4}^{th}$ clock signal output 321, 421. The shapes and locations of pulses on clock signal output 321, 421 are used as a gap indicator signal within the encoding scheme employed by the data/timing encoder 307 of FIG. 3. A discussion of an encoding scheme and corresponding operation of data/timing encoder 307 of FIG. 3 immediately follows.

Figure 5A:
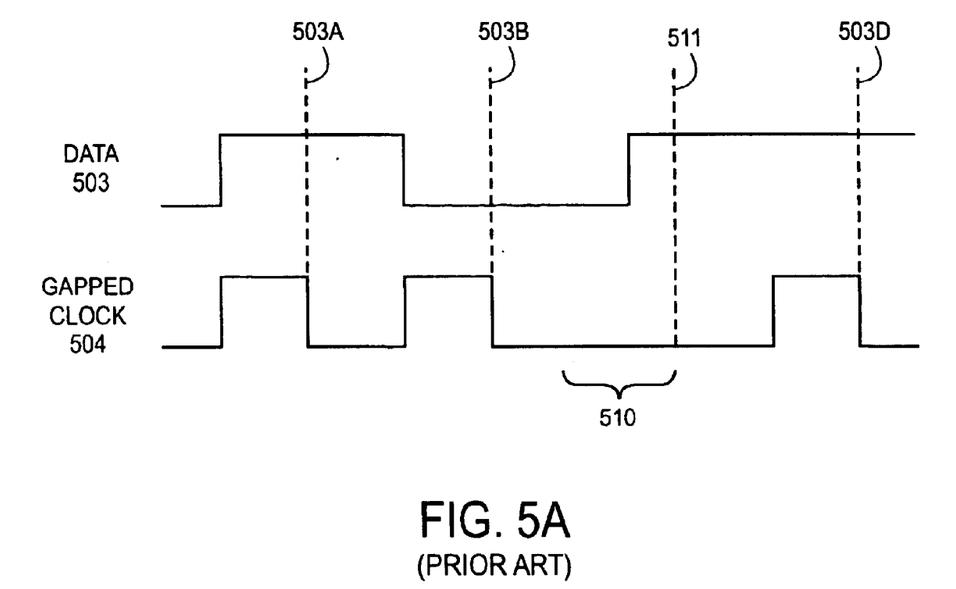
FIG. 5a shows a depiction of a prior art gapped clock encoding scheme.
Figure 5B:
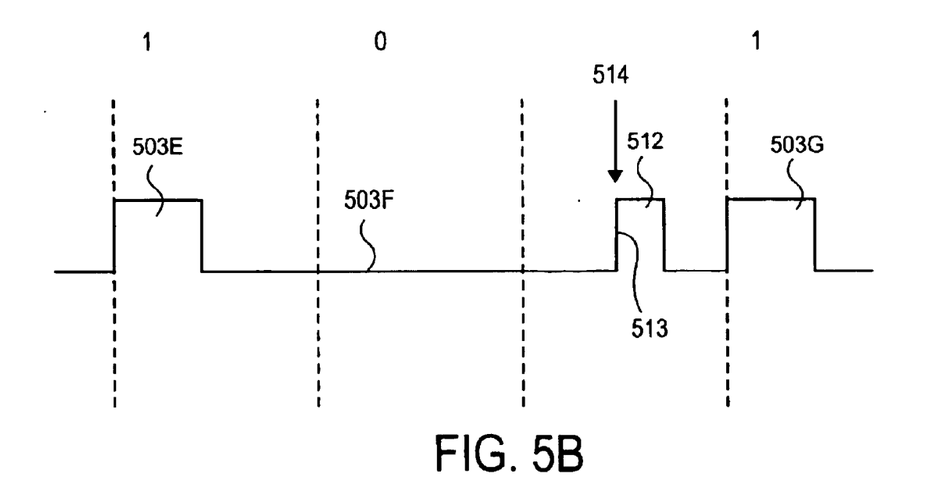
FIGS. 5b and 5c show depictions of an improved gapped clock encoding scheme.

As discussed, data/timing encoder 307 is responsible for merging a gapped clock signal with a data signal such that the gapped clock information and data information are integrated together on the same wire or net. A depiction of an integration approach is shown in FIGS. 5a and 5b. FIG. 5a shows a traditional approach that consumes two nets for data information 503 and gapped clock information 504. Typically, the absence of a clock pulse (e.g., at time window 510) in the gapped clock 504 signal means the corresponding data value (e.g., the data value at time location 511) is irrelevant or otherwise invalid. Thus, in FIG. 5a, only data values at time locations 503a,b, and d are valid. Thus FIG. 5a to a data value of "101" rather than "1011".

FIG. 5b, shows an encoding method that merges the information of FIG. 5a into a single wire or net. In FIG. 5b, the presence of an invalid bit is represented by an indicator signal, such as indicator signal 512. The indicator signal 512 embodiment of FIG. 5b has a rising edge 513 at a location in time 514 where valid data values (e.g., data high values 503e,g, and data low value 503f) are not supposed to have a rising edge location. As such, indicator signal 512 is readily identifiable as corresponding to a window in time where no valid data exists.

By recognizing that data values 503e,f, and g do not have an improperly positioned edge while indicator signal 512 has an improper edge 513 position 514, a receiving device may readily determine that data values 503e,f and g are the only valid data information in the stream of FIG. 5b. Thus, FIG. 5b may also be recognized as having a data value of "101".

Figure 5C:
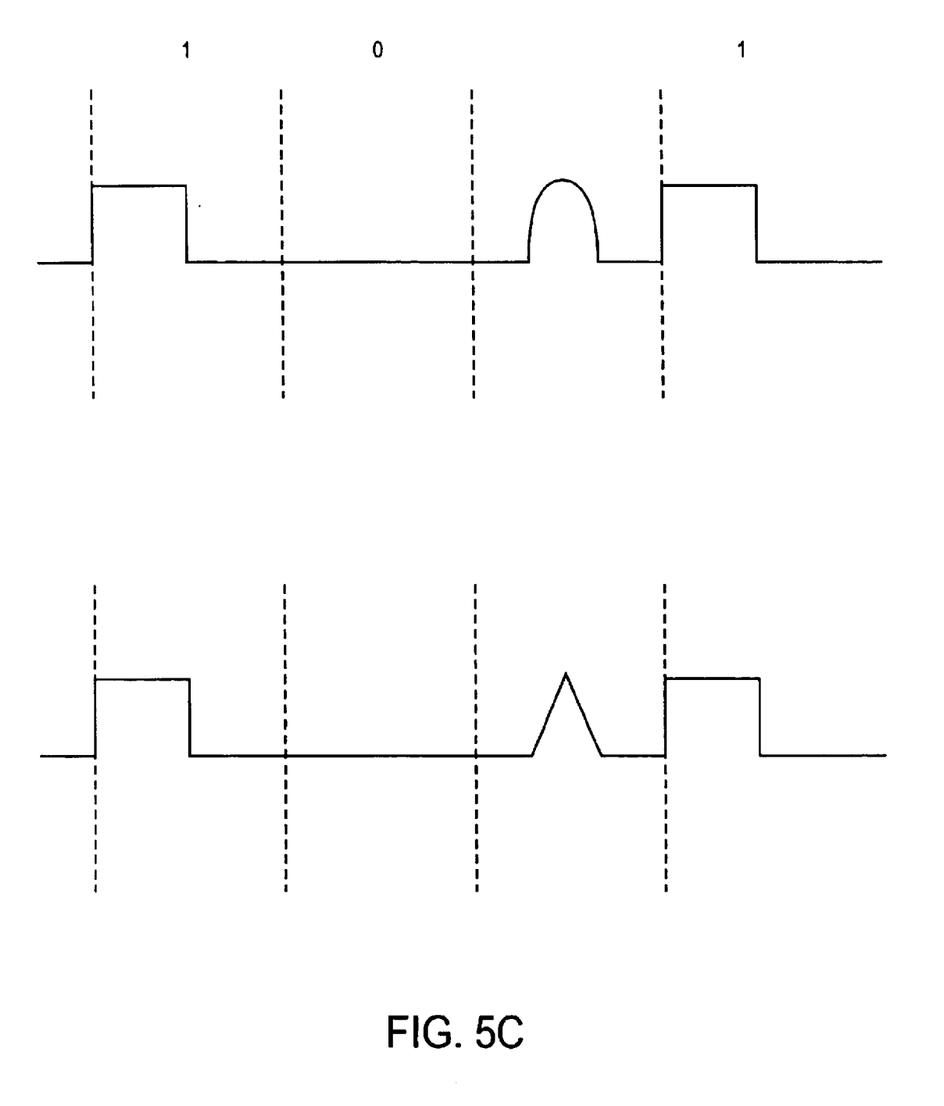

Note that many other indicator signals types are possible. For example, an indicator signal may be a signal that swings negative (while valid data values swing positive) or only has a fraction of the amplitude of a valid data pulse. Other indicator signal shapes besides pulses such as triangular or sinusoidal shapes (as observed in FIG. 5c) are possible as well.

Thus, indicator signals are signals having a shape and/or temporal location that is different than the shape and/or temporal location of the signals used to represent valid data values. Note that this approach is applicable in data stream embodiments where data values are represented with signal shapes other than pulses (e.g., for "1" data values) as well.

Figure 6:
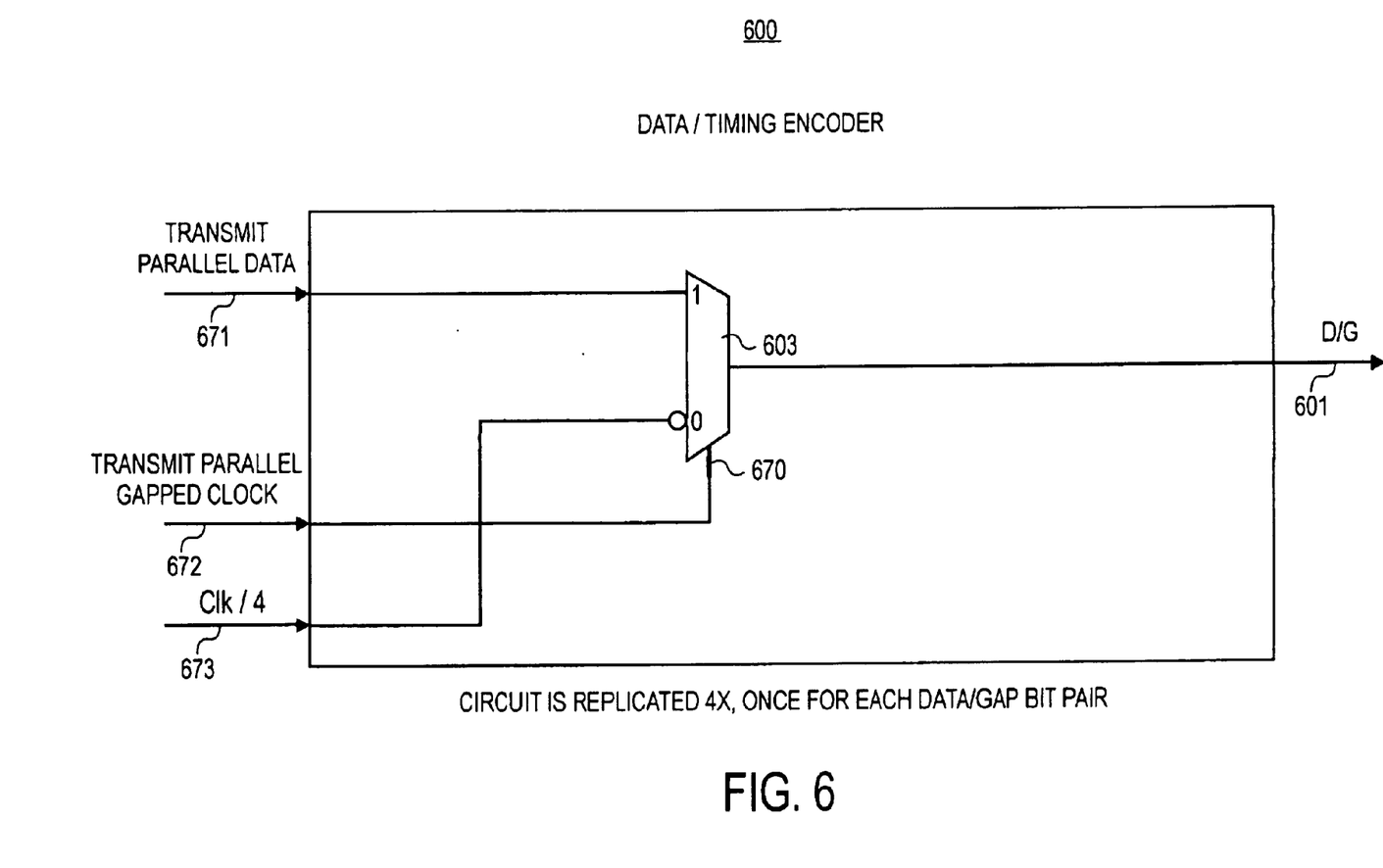
FIG. 6 shows an embodiment of the data/timing encoder of FIG. 3.

FIG. 6 shows a design embodiment 600 for the data/timing encoder 307 of FIG. 3. Note the encoder embodiment 600 should be repeated four times, one for each pair of transmit parallel data and transmit parallel gapped clock nets. The encoder embodiment 600 accepts a transmit parallel data net 671, a transmit parallel gapped clock net 672 and a ¼$^{th}$ clock signal net 673. Recall that the ¼$^{th}$ clock is used as the indicator signal in this embodiment.

Encoder 600 transmits (into the D/G output 601 stream) transmit parallel data net 671 values as long as the corresponding transmit parallel gapped clock net 672 indicates that data is valid. However, if the transmit parallel gapped clock net 672 value indicates the data is not valid, encoder 600 inserts into the output D/G stream 601 the indicator signal (i.e., the ¼$^{th}$ clock signal).

As such a multiplexor 603 is used to drive D/G output 601. Multiplexor circuits enable a specific channel based upon the status of a channel select input. An enabled channel has its data values presented at the multiplexor output. In FIG. 6, parallel gapped clock net 672, being coupled to the channel select input 670 controls which channel input is enabled: either the transmit parallel data or the indicator signal 673 (i.e., the ¼$^{th}$ clock signal).

Figure 7:
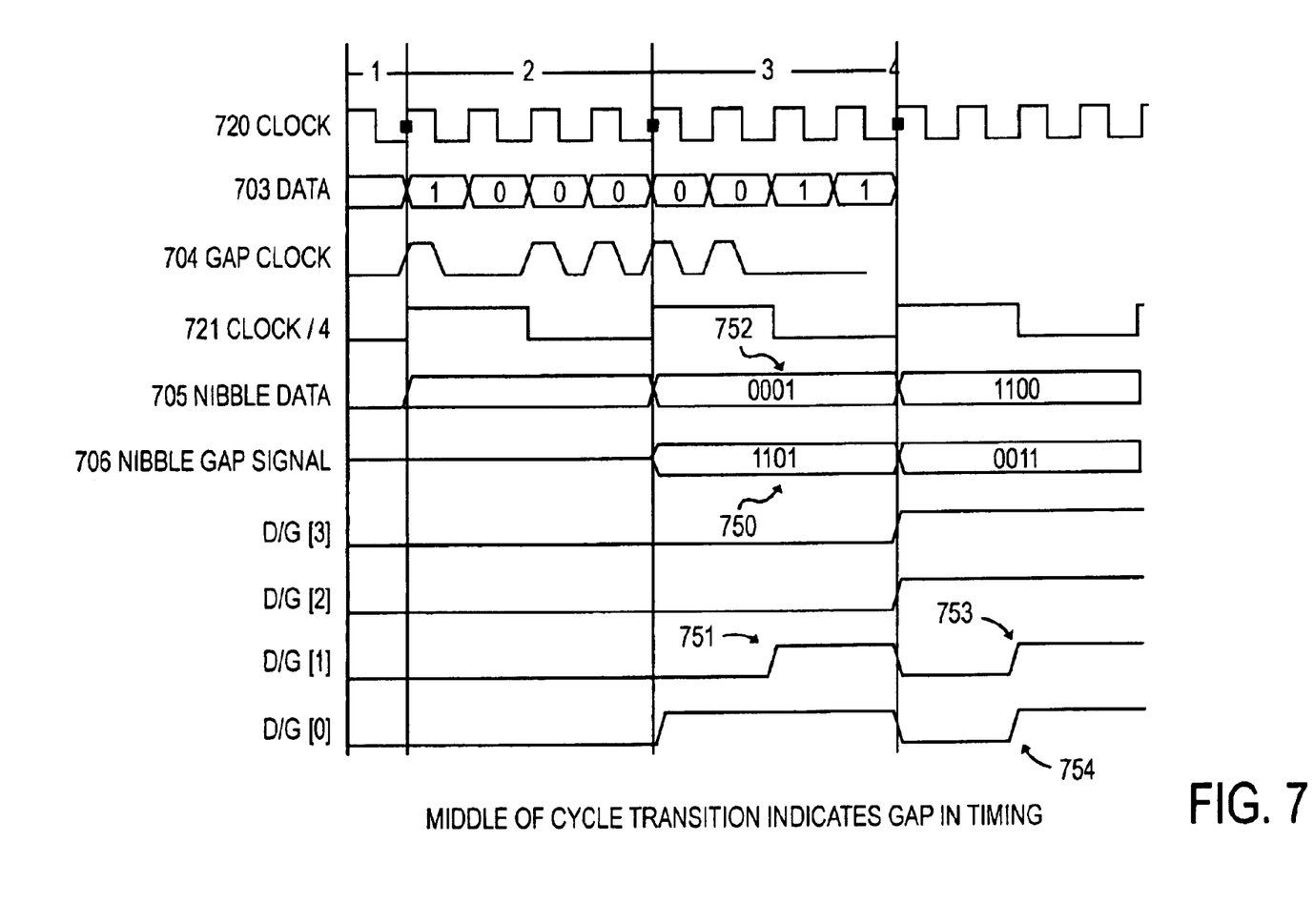
FIG. 7 shows a timing diagram example for the circuit embodiment of FIG. 3.

FIG. 7 shows a timing diagram for the overall transmit operation. Referring to FIGS. 3 and 7, data 703, gap clock 704 and clock 720 correspond to the serial data 303, gapped clock 304 and clock 320 inputs of FIG. 3. The serial/parallel converter 304: 1) converts the serial data 303, 703 into four transmit parallel data nets 305 (represented by nibble data 705 in FIG. 7); 2) converts the serial gapped clock 304, 704 into four transmit parallel gapped clock nets 306 (represented by nibble gap signal 706); and 3) divides the clock 320, 720 by four into the ¼$^{th}$ clock 321, 721.

The data/timing encoder 307 merges the nibble data and gapped clock information. Thus, for the first set of nibbles in FIG. 7, D/G[1] has an inserted indicator signal 751 since the second bit 750 of the corresponding nibble gap signal indicates the data value 752 at that timing location is invalid. Reading the remaining D/G signals from most significant bit to least significant bit (e.g., D/G[3], D/G[2], D/G[0]) the valid data in the first set of nibbles is "001".

Similarly, the second set of nibbles indicates the valid data is found on the D/G[3] and D/G[2] nets resulting in a valid data value of "00" in the second set of nibbles. As such the D/G[1] and D/G[0] nets both have indicator signals 753, 754 rather than recognizable, valid data shapes. The D/G signals of FIG. 7 are the signals physically transmitted over connector 105 of FIG. 1.

Figure 8:
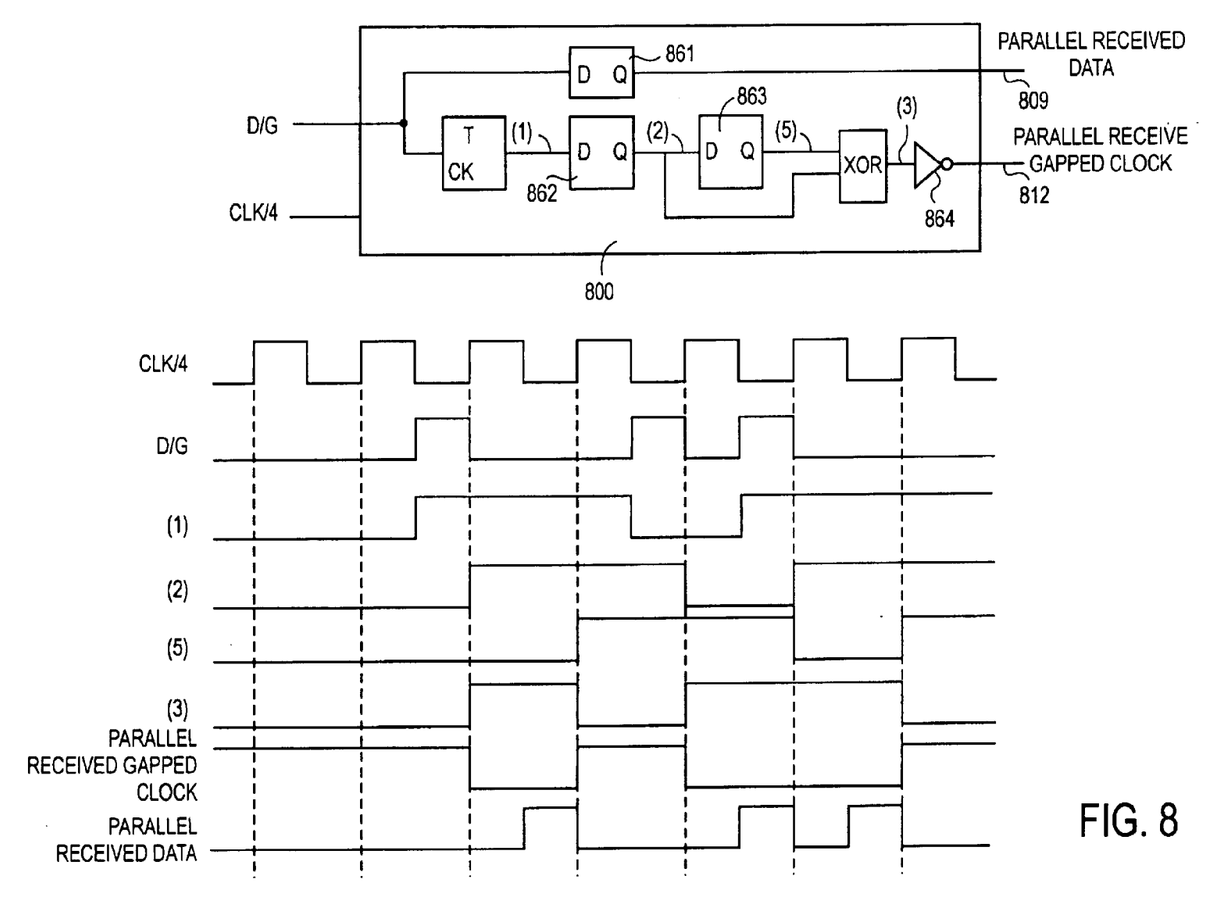
FIG. 8 shows an embodiment for the data/timing decoder of FIG. 3.

FIG. 8 shows an embodiment 800 of a design for the data/timing decoder 308 of FIG. 3. In the embodiment of FIG. 3, the data/timing decoder 308 converts each of the D/G signals 301 into pairs of received parallel data and received parallel gapped clock nets. The data/timing decoder embodiment 800 of FIG. 8 is comprised by the repetition of basic design 800 that performs the above described function for each of the four D/G signal nets.

The basic design 800 of FIG. 8 is designed to look for the indicator signal. Regardless whether or not the indicator signal is present, the basic design 800 couples each D/G signal net input to the parallel received data output net 809 through a DQ flip flop 861. Referring back to FIG. 3, since only valid signals are eventually sent to higher layers in the system utilizing the interface 300, any discrepancies between the transmit parallel data signal 303 and the receive parallel data signal 309 at invalid data locations is irrelevant. Thus transmission of the indication signal into the receive parallel data signal 809 of FIG. 8 is acceptable.

The T and DQ flip flops 862, 863 the XOR gate 863 and inverter 864 form the parallel receive gapped clock signal 812 as shown in the timing diagram 470 of FIG. 4. DQ flip flops 861, 862, 863 are clocked by the CLK/4 signal. Referring back to FIG. 3, as discussed, after the data/timing decoder 308 separates each D/G net into pairs of data and gapped clock nets, the parallel/serial block 313 serializes the parallel receive data signal 309 into the serial data output 314 as well as serializes the parallel receive gapped clock signal 312 into a gapped clock output 315.

It is important to note that although the present discussion has addressed a specific problem concerning the interface of a WAN daughter card to a LAN base card, many other engineering situations may take advantage of the teachings presented herein. That is, many computing or networking systems are faced with the challenge of improving bandwidth yet are constrained as to real estate consumption such that a direct serial to parallel implementation is not feasible.

The interface described herein may be implemented within a number of different semiconductor technologies such as standard off the shelf products, application specific integrated circuits (ASICs) or programmable devices such as Programmable Logic Devices (PLDs) Programmable Logic Arrays (PLAs) or Field Programmable Gate Arrays (FPGAs).

Note also that embodiments of this invention may be implemented not only within a semiconductor chip but also within machine readable media. For example, these designs may be stored upon and/or embedded within machine readable media associated with a software design tool used for designing semiconductor devices. Examples include architectural level descriptions (e.g., a VHSIC Hardware Description Language (VHDL) netlist), gate level descriptions (e.g., a Verilog Register Transfer Level (RTL) netlist), and transistor level descriptions (e.g., a Simulation Program with Integrated Circuit Emphasis (SPICE) or SPICE related netlist). Note that such descriptions may be synthesized as well as synthesizable. Machine readable media also includes media having layout information such as a GDS-II file. Furthermore, netlist files or other machine readable media for semiconductor chip design may be used in a simulation environment to perform any methods of the designs described above.

Thus, it is also to be understood that embodiments of this invention may be used as or to support software programs executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a parallel arrangement of multiplexers, each multiplexer having a first input coupled to a data signal net and a second input coupled to an indication signal net, said data signal net to transport a data signal, said indication signal net to transport an indication signal having a different feature than said data signal, said different feature selected from the group consisting of:
   (i) different shape; and,
   (ii) different temporal edge position.

2. The apparatus of claim 1 wherein said indication signal is a pulse.

3. The apparatus of claim 1 wherein said multiplexer further comprises a channel select input coupled to a gapped clock net.

4. The apparatus of claim 1 wherein each of said multiplexers' first inputs are coupled to a different output of a serial to parallel converter.

5. The apparatus of claim 1 further comprising a circuit having a different input coupled to a different multiplexer output, each multiplexer output coupled to a said input of said circuit.

6. The apparatus of claim 5 further comprising a connector between said parallel arrangement of multiplexers and said circuit.

7. The apparatus of claim 1 wherein each multiplexer output is coupled to net that is designed to transport signals to a connector.

8. The apparatus of claim 1 wherein said parallel arrangement of multiplexers resides on a networking adapter card.

9. The apparatus of claim 8 wherein said networking adapter card is within a networking system.

10. A method, comprising:
    accepting a parallel stream of data signals;
    accepting an indicator signal, said indicator signal having a different appearance than the data signals of said parallel stream of data signals, said different appearance characterized by one or more items selected from the group consisting of:
    (i) different shape;
    (ii) different temporal edge position;
    accepting a parallel stream of gapped clock signals that identify invalid data signals amongst said parallel stream of data signals; and,
    forwarding said parallel stream of data signals with an invalid data signal being replaced by said indicator signal within said forwarded parallel stream of data signals.

11. The method of claim 10 further comprising converting a serial data stream into said parallel stream of data signals.

12. The method of claim 10 further comprising converting a serial gapped clock stream into said parallel stream of gapped clock signals.

13. The method of claim 10 wherein said forwarding further comprises transmitting said forwarded parallel stream of data signals over a connector.

14. The method of claim 10 further comprising reproducing said parallel stream of data streams and said parallel stream of gapped clock signals from said forwarded parallel stream of data signals.

15. The method of claim 14 wherein said reproducing further comprises recognizing said indicator signal.

16. The method of claim 14 further comprising producing a serial data stream from said reproduced parallel stream of data signals.

17. An apparatus, comprising:
    a) a parallel arrangement of data nets, each data net to transport its own stream of data signals;
    b) a parallel arrangement of gapped clock nets, each gapped clock net paired with one of said data nets, each gapped clock net to transport its own gapped clock signal that identifies invalid data within the stream of data signals carried by the data net it is paired with;
    c) a net configured to transport an indication signal, said indication signal being different than said data signals, the difference between said indication signal and said data signals characterized by one or more of the following:
    (i) different shape;
    (ii) different temporal edge position;
    (iii) different amplitude; and,
    (iv) different polarity; and,
    d) a circuit designed to replace an invalid data signal with said indication signal within the stream of data signals that said invalid data signal is a part of, said invalid data signal identified by reference to the gapped clock signal that is paired with the stream of data signals that said invalid data signal is a part of.

18. The apparatus of claim 17 wherein said circuit further comprises a multiplexer having a channel select input coupled to the gapped signal net that transports the gapped clock signal that is paired with the stream of data signals that said invalid data signal is a part of.

19. The apparatus of claim 18 wherein said multiplexer further comprises a first input coupled to the data net that transports the stream of data signals that said invalid data is a part of.

20. The apparatus of claim 19 wherein said circuit further comprises a multiplexer having a second input coupled to said net.

21. The apparatus of claim 17 wherein said indication signal is a clock signal pulse.

22. The apparatus of claim 21 wherein said indication signal is a signal that is formed by dividing down from another clock signal, said apparatus further comprising a divider to perform said dividing.

23. The apparatus of claim 18 wherein said indication signal is sinusoidal.

24. The apparatus of claim 18 wherein said indication signal is triangular.

25. A method, comprising:

generating a parallel stream of data signals;

generating an indicator signal, said indicator signal having features that are different than the features of data signals found within said parallel stream of data signals, said different features of said indicator signal being one or more different features selected from the group consisting of:
  (i) different shape;
  (ii) different temporal edge position;
  (iii) different amplitude; and,
  (iv) different polarity;

generating a parallel stream of gapped clock signals that are associated with said parallel stream of data signals to identify invalid data signals with said parallel stream of data signals;

removing from a stream of data signals an invalid data signal identified by one said of gapped clock signals and inserting said indicator signal within said stream of data signals within a clock cycle previously occupied by said invalid data signal.

26. The method of claim 25 further comprising converting a serial data stream into said parallel stream of data signals.

27. The method of claim 25 further comprising converting a serial gapped clock stream into said parallel stream of gapped clock signals.

28. The method of claim 25 wherein said removing and inserting further comprises multiplexing said indicator signal into said stream of data signals at said clock cycle.

29. The method of claim 25 wherein said indication signal is a clock pulse.

30. The method of claim 29 wherein said clock pulse is crafted by dividing down a clock signal.

31. The method apparatus of claim 25 wherein said indication signal is sinusoidal.

32. The method apparatus of claim 25 wherein said indication signal is triangular.

33. A method, comprising:

means for generating an indicator signal, said indicator signal having features that are different than the features of data signals found within a parallel stream of data signals, said different features of said indicator signal being one or more different features selected from the group consisting of:
  (i) different shape;
  (ii) different temporal edge position;
  (iii) different amplitude; and,
  (iv) different polarity;

means for generating a parallel stream of gapped clock signals that are associated with said parallel stream of data signals to identify invalid data signals with said parallel stream of data signals; and, means for removing from a stream of data signals an invalid data signal identified by one said of gapped clock signals and inserting said indicator signal within said stream of data signals within a clock cycle previously occupied by said invalid data signal.

34. The method of claim 33 further comprising converting a serial data stream into said parallel stream of data signals.

35. The method of claim 33 further comprising converting a serial gapped clock stream into said parallel stream of gapped clock signals.

36. The method of claim 33 wherein said stream of data signals at said clock cycle.

37. The method of claim 33 wherein said indication signal is a clock pulse.

38. The method of claim 37 wherein said clock pulse is crafted by dividing down a clock signal.

39. The method of claim 25 wherein said indication signal is sinusoidal.

40. The method of claim 25 wherein said indication signal is triangular.

* * * * *